United States Patent
Yang et al.

(10) Patent No.: US 7,916,703 B2
(45) Date of Patent: Mar. 29, 2011

(54) WIRELESS LOCAL AREA NETWORK (WLAN) AND METHOD OF TRANSMITTING FRAME IN THE WLAN

(75) Inventors: Jin-Woo Yang, Seongnam-si (KR); Sang-Yeon Won, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1156 days.

(21) Appl. No.: 11/604,713

(22) Filed: Nov. 28, 2006

(65) Prior Publication Data

US 2007/0153755 A1     Jul. 5, 2007

(30) Foreign Application Priority Data

Jan. 2, 2006 (KR) .................. 10-2006-0000230

(51) Int. Cl.
*H04W 4/00* (2009.01)
(52) U.S. Cl. .................. 370/338; 370/348; 455/450
(58) Field of Classification Search ....... 455/450–452.2, 455/509, 41.2; 370/338, 345, 348, 468
See application file for complete search history.

(56) References Cited

U.S. PATENT DOCUMENTS

| | | | |
|---|---|---|---|
| 5,231,634 A * | 7/1993 | Giles et al. | 370/348 |
| 6,977,944 B2 * | 12/2005 | Brockmann et al. | 370/461 |
| 7,054,296 B1 * | 5/2006 | Sorrells et al. | 370/338 |
| 7,054,329 B2 * | 5/2006 | Cervello et al. | 370/447 |
| 7,103,386 B2 * | 9/2006 | Hoffmann et al. | 455/562.1 |
| 7,180,905 B2 * | 2/2007 | Benveniste | 370/445 |
| 7,224,679 B2 * | 5/2007 | Solomon et al. | 370/338 |
| 7,382,756 B2 * | 6/2008 | Barber et al. | 370/338 |
| 7,623,481 B2 * | 11/2009 | Chen | 370/322 |
| 7,656,899 B2 * | 2/2010 | Chandra | 370/468 |
| 7,768,988 B2 * | 8/2010 | Li et al. | 370/345 |
| 7,787,415 B2 * | 8/2010 | Hunkeler et al. | 370/328 |
| 7,826,473 B2 * | 11/2010 | Kwon et al. | 370/445 |
| 2003/0152058 A1 * | 8/2003 | Cimini et al. | 370/338 |
| 2005/0058151 A1 * | 3/2005 | Yeh | 370/445 |
| 2005/0099978 A1 * | 5/2005 | Chandra et al. | 370/338 |
| 2007/0217378 A1 * | 9/2007 | Moorti et al. | 370/338 |

* cited by examiner

*Primary Examiner* — Sharad Rampuria
(74) *Attorney, Agent, or Firm* — H.C. Park & Associates, PLC (57) ABSTRACT

In a Wireless Local Area Network (WLAN) and a method of transmitting a frame in the WLAN, mode information and an available data transfer rate of each wireless terminal located within a coverage of an Access Point (AP) are collected. A determination is made as to whether or not the AP transmits a Clear To Send (CTS) frame depending upon an existence of wireless terminals corresponding to the collected mode information before the AP transmits a data frame to at least one wireless terminal. A data transfer rate of the CTS frame is adjusted based on the collected available data transfer rate of each of the wireless terminals to transmit the CTS frame at the adjusted data transfer rate. Therefore, both the stability and the bandwidth effectiveness may be enhanced.

20 Claims, 4 Drawing Sheets

WIRELESS LOCAL AREA NETWORK (WLAN) AND METHOD OF TRANSMITTING FRAME IN THE WLAN

CLAIM OF PRIORITY

This application makes reference to, incorporates the same herein, and claims all benefits accruing under 35 U.S.C. §119 from an application for WIRELESS LAN AND METHOD FOR TRANSMITTING FRAMES THEREOF earlier filed in the Korean Intellectual Property Office on 2 Jan. 2006 and there duly assigned Serial No. 10-2006-0000230.

BACKGROUND OF THE INVENTION

1. Field of the Invention

The present invention relates to a Wireless Local Area Network (WLAN) and a method of transmitting frames in the WLAN.

2. Description of the Related Art

A data transfer rate of the Wireless Local Area Network (WLAN) has been increased for years. A throughput of a cellular network is not high enough for multi-media service, however the WLAN provide 54 Mbps of Internet access service. The WLAN can be applicable to a mobile communication because the WLAN has wide bandwidth and low service charge.

IEEE 802.11 is an early wireless network standard for the WLAN. IEEE 802.11 compliant device operates at a maximum data transfer rate of 2 Mbps, transfers data frame using an infrared ray or a signal having 2.4 GHz Industrial, Scientific, Medical (ISM) band, and uses Carrier Sensing Multiple Access/Collision Avoidance (CSMA/CA) scheme.

IEEE 802.11b has emerged from IEEE 802.11 and provides a maximum data transfer rate of 11 Mbps. However, it provides a data transfer rate in a range of from 6 Mbps to 7 Mbps using the CSMA/CA scheme. IEEE 802.11a compliant devices operate at 5 GHz band. IEEE 802.11a can support a maximum data transfer rate of 54 Mbps using an Orthogonal Frequency Division Multiplexing (OFDM) scheme. Interference with other communication devices, such as mobile phones and Bluetooth devices in the 5 GHz band, is less than that in the 2.4 GHz, and the frequency band of 5 GHz is wider than that of 2 GHz. However, a 5 GHz band signal is easily affected by circumstances, such as obstacles and buildings. Thus, IEEE 802.11a is not widely used since the appearance of IEEE 802.11g that supports 54 Mbps of data transfer rate.

IEEE 802.11g has the same data transfer method and the same data transfer rate as those of IEEE 802.11a, and differs from IEEE 802.11a in that IEEE 802.11g uses a 2.4 GHz band signal. IEEE 802.11g is compatible with IEEE 802.11b. For example, IEEE 802.11g uses a frequency band in the range of from 2401 MHz to 2483 MHz. The full frequency band of IEEE 802.11g is divided into 113 frequency bands to which a total of 13 channels are assigned. A center frequency of the 13 channels begins at 2412 MHz, and center frequencies of the 13 channels are separated by 5 MHz. One channel occupies about a 22 MHz bandwidth, and thus interference occurs between channels having center frequencies which are not separated enough.

In a WLAN, some problems that do not occurs in a wire LAN are generated due to the cell coverage of the WLAN. A node 'A' and node 'B' cannot detect a signal from the other nodes due to the limited cell coverage. When nodes 'A' and 'C' respectively transmit data frame at the same time to node 'B', there is a high possibility of collision between the data frames of the nodes 'A' and 'C'.

In a WLAN that transmits RTS/CTS frames, two additional frames, i.e. a Request To Send (RTS) frame and a Clear To Send (CTS) frame, are added to the IEEE 802.11 MAC frame so as to solve the problem noted above. When a source node transmits the RTS frame, the destination node transmits the CTS frame in response to the RTS frame. The RTS frame is transmitted before a data frame is transmitted. The nodes receiving the RTS and CTS frames cease to transmit frames during an interval that is contained in the RTS/CTS frames.

When the source node is 'A' and the destination node is 'B', the node 'B' that received the RTS frame from the node 'A' transmits the CTS frame to node 'A' in response to the RTS frame, and node 'C' can receive the CTS frame transmitted from the node 'B' since the node 'C' is located within the cell coverage of the node 'B'. The node 'C' ceases to transmit frames during the interval that is contained in the CTS frame that is transmitted from the node 'B'. Due to the cell coverage of the node 'A', nodes other than node 'A' cease to transmit frames for a predetermined interval from a time point when the node 'A' transmits the RTS frame. Due to the cell coverage of the node 'B', nodes other than node 'B' cease to transmit frames for a predetermined interval from a time point when the node 'B' transmits the CTS frame.

The RTS/CTS frame cannot be used when a large bandwidth is not required, or when nodes located in a small area can transmit/receive frames to/from each other, or when many channels are not concentrated.

In a virtual carrier sensing method of an IEEE 802.11 WLAN, in order to provide a reservation status of a channel, a node at a transmitter side transmits an RTS frame and a node at a receiver side transmits a CTS frame to the node at the transmitter side and nodes around the node at the receiver side in response to the RTS frame before a node transmits a data frame, or a reservation status of a channel can be provided using Duration/ID fields contained in the frame to be transmitted.

A method of providing a reservation status of a channel using the Duration/ID fields contained in the frame to be transmitted, and the other nodes are provided with an indication that a medium is busy (or reserved) during a predetermined interval using the Duration/ID fields. In the IEEE 802.11 WLAN, a node (sender) at a transmitter side transmits a frame having a Duration field containing information about an interval (duration) during which a node (receiver) at a receiver side can transmit an ACK frame to the sender without collision. The other nodes except the sender and the receiver cease to transmit a data frame (DATA) during the duration so that the receiver cam successfully transmit the ACK frame to the sender.

However, if a node does not provide the duration contained in the data frame transmitted from another node and the node transmits a data frame to another node, the ACK frame cannot be successfully transmitted.

Particularly, in a WLAN environment in which both wireless terminals conforming to IEEE 802.11b and wireless terminals conforming to IEEE 802.11g are located, it is impossible for a wireless terminal conforming to IEEE 802.11b to demodulate a data frame conforming to IEEE 802.11g using the OFDM modulation scheme, and thus a collision during data frame transmission can occur.

SUMMARY OF THE INVENTION

It is an object of the present invention to provide a Wireless Local Area Network (WLAN) and a method of transmitting a frame in the WLAN, in which a data transfer rate of a Clear To Send (CTS) frame is variably adjusted based on the status of wireless terminals located within cell coverage of an Access Point (AP), and the CTS frame is transmitted at the adjusted data transfer rate.

According to one aspect of the present invention, a method of transmitting a frame in a WLAN is provided, the method including: collecting mode information and an available data transfer rate of each wireless terminal located within a coverage of the AP; determining whether or not the AP transmits a CTS frame depending upon an existence of wireless terminals corresponding to the collected mode information before the AP transmits a data frame to at least one wireless terminal among all of the wireless terminals located within a coverage of the AP; and adjusting a data transfer rate of the CTS frame based on the collected available data transfer rate of each of the wireless terminals to transmit the CTS frame at the adjusted data transfer rate.

The mode information preferably includes information representing one of IEEE 802.11b and IEEE 802.11g.

Determining whether or not the AP transmits a CTS frame preferably includes transmitting the CTS frame when at least one first wireless terminal conforming to IEEE 802.11b and at least one second wireless terminal conforming to IEEE 802.11g are located within a coverage of the AP.

The adjusted data transfer rate of the CTS frame preferably corresponds to a minimum data transfer rate of available data transfer rates of the at least one first wireless terminal conforming to IEEE 802.11b.

Determining whether or not the AP transmits a CTS frame preferably includes determining that the CTS frame is not transmitted when only first wireless terminals conforming to IEEE 802.11b are located within a coverage of the AP, or when only second wireless terminals conforming to IEEE 802.11g are located within a coverage of the AP.

The CTS frame is preferably modulated using Complementary Code Keying (CCK) when the adjusted data transfer rate of the CTS frame corresponds to 5.5 Mbps or 11 Mbps, and the CTS frame is preferably modulated using Binary Phase Shift Keying (BPSK) or Quadrature Phase Shift Keying (QPSK) when the adjusted data transfer rate of the CTS frame corresponds to 1 Mbps or 2 Mbps.

The method preferably further includes transmitting a data frame modulated using. CCK or Orthogonal Frequency Division Multiplexing (OFDM) depending upon the mode information of each of the wireless terminals.

The method preferably further includes receiving the data frame to transmit an ACK frame to the AP by at least one first wireless terminal corresponding to a destination of the data frame.

The method preferably further includes receiving the CTS frame from the AP to cease a data transmission of at least one second wireless terminal during an interval corresponding to a transmission cease time included in a duration field of the CTS frame, the at least one second wireless terminal not corresponding to a destination of the data frame.

According to another aspect of the present invention, a method of transmitting a frame in an Access Point (AP) of a Wireless Local Area Network (WLAN) is provided, the method including: collecting mode information representing one of IEEE 802.11b and IEEE 802.11g and an available data transfer rate of each wireless terminal located within a coverage of the AP; transmitting a Clear To Send (CTS) frame at a minimum data transfer rate of available data transfer rates of at least one first wireless terminal conforming to IEEE 802.11b before sending a data frame when both the at least one first wireless terminal conforming to IEEE 802.11b and at least one second wireless terminal conforming to IEEE 802.11g are located within the coverage of the AP.

The CTS frame is preferably not transmitted when only first wireless terminals conforming to IEEE 802.11b are located within the coverage of the AP, and whether or not the CTS frame is transmitted is preferably determined based on a number of second wireless terminals conforming to IEEE 802.11g and distances between each of the second wireless terminals and the AP when only the second wireless terminals conforming to IEEE 802.11g are located within the coverage of the AP.

According to still another aspect of the present invention, a Wireless Local Area Network (WLAN) is provided including: an Access Point (AP) adapted to collect mode information and an available data transfer rate of each wireless terminal located within a coverage of the AP, to determine whether or not the AP transmits a Clear To Send (CTS) frame depending upon an existence of wireless terminals corresponding to the collected mode information before the AP transmits a data frame, and to adjust a data transfer rate of the CTS frame based on the collected available data transfer rate of each of the wireless terminals to transmit the CTS frame at the adjusted data transfer rate; and at least one wireless terminal adapted to receive the CTS frame from the AP to cease a data transmission of the at least one wireless terminal during an interval corresponding to a transmission cease time included in a duration field of the CTS frame.

The mode information preferably includes information representing one of IEEE 802.11b and IEEE 802.11g.

The AP is preferably adapted to transmit the CTS frame at a minimum data transfer rate of available data transfer rates of at least one first wireless terminal conforming to IEEE 802.11b when both the at least one first wireless terminal conforming to IEEE 802.11b and at least one second wireless terminal conforming to IEEE 802.11g are located within the coverage of the AP.

The CTS frame is preferably not transmitted when only first wireless terminals conforming to IEEE 802.11b are located within the coverage of the AP, or when only second wireless terminals conforming to IEEE 802.11g are located within the coverage of the AP.

The CTS frame is preferably modulated using Complementary Code Keying (CCK) when the adjusted data transfer rate of the CTS frame corresponds to 5.5 Mbps or 11 Mbps, and the CTS frame is preferably modulated using Binary Phase Shift Keying (BPSK) or Quadrature Phase Shift Keying (QPSK) when the adjusted data transfer rate of the CTS frame corresponds to 1 Mbps or 2 Mbps.

According to yet another aspect of the present invention, an Access Point (AP) conforming to both IEEE 802.11b and IEEE 802.11b is provided, the AP including: a storage unit adapted to store information about all wireless terminals located within a coverage of the AP; a controller adapted to collect mode information of each of the wireless terminals, and to determine a data transfer rate of a Clear To Send (CTS) frame, the determined data transfer rate of the CTS frame corresponding to a minimum data transfer rate of available data transfer rates of at least one first wireless terminal conforming to IEEE 802.11b when both the at least one first wireless terminal conforming to IEEE 802.11b and at least one second wireless terminal conforming to IEEE 802.11g are located within the coverage of the AP; and a frame generator adapted to generate the CTS frame based on the determined data transfer rate of the CTS frame.

The frame generator is preferably adapted to modulate the CTS frame using Complementary Code Keying (CCK) when the determined data transfer rate of the CTS frame corresponds to 5.5 Mbps or 11 Mbps, and to modulate the CTS frame using Binary Phase Shift Keying (BPSK) or Quadrature Phase Shift Keying (QPSK) when the determined data transfer rate of the CTS frame corresponds to 1 Mbps or 2 Mbps.

The information about each of the wireless terminals preferably includes at least one of a Media Access Control (MAC) address, a mode and available data transfer rate of each of the wireless terminals.

The AP preferably further includes a frame transmitter adapted to transmit the CTS frame generated by the frame generator or a data frame to at least one wireless terminal.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1:
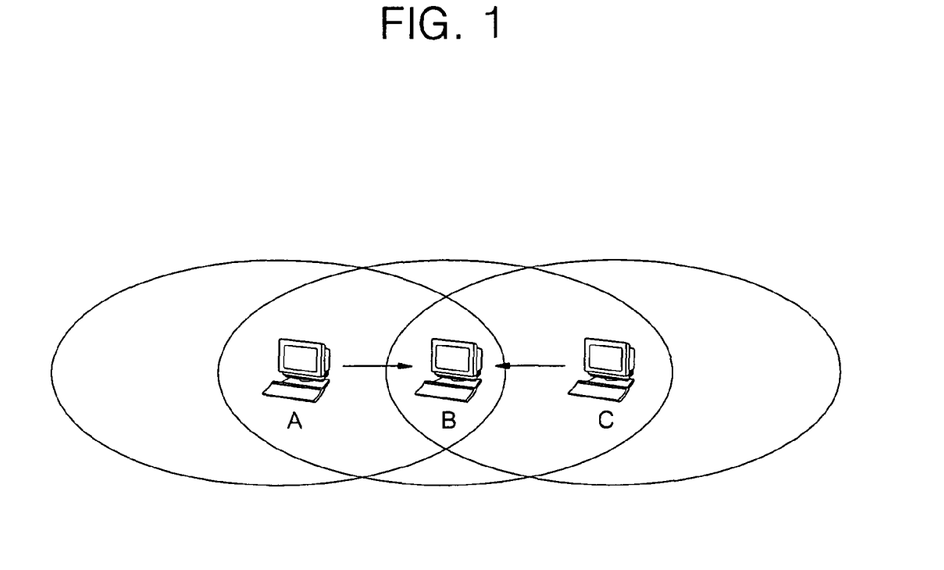
FIG. 1 is a diagram of cell coverage of each node in a Wireless Local Area Network (WLAN)

FIG. 1 is a diagram of cell coverage of each node in a Wireless Local Area Network (WLAN). In the WLAN, some problems that do not occur in a wire LAN are generated due to the cell coverage of the WLAN. A node 'A' and node 'B' cannot detect a signal from the other nodes due to the limited cell coverage. When nodes 'A' and 'C' respectively transmit data frame at the same time to node 'B', there is a high possibility of collision between the data frames of the nodes 'A' and 'C'.

Figure 2:
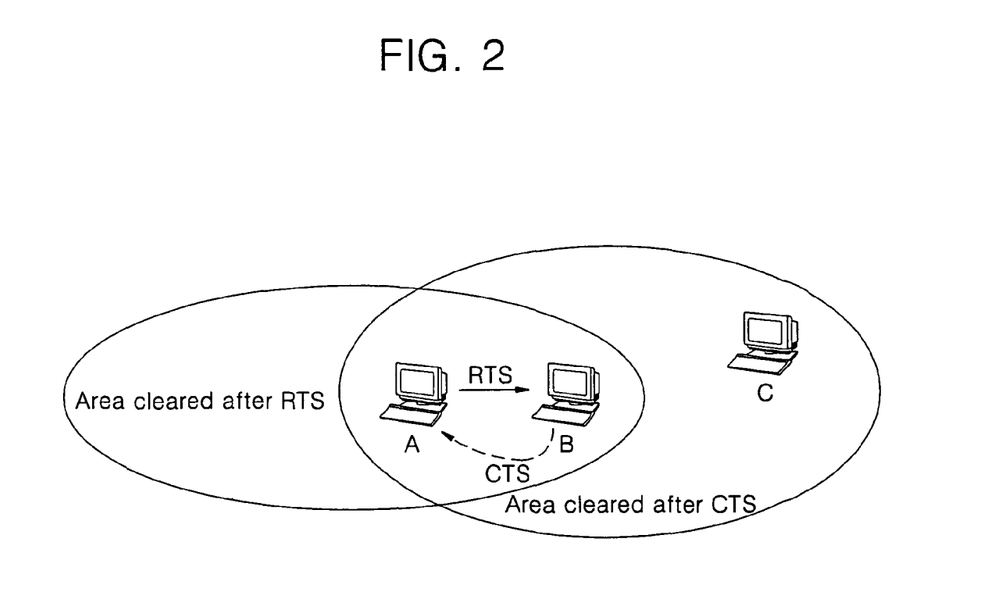
FIG. 2 is a diagram of a WLAN that transmits Request To Send (RTS)/Clear To Send (CTS) frames.

FIG. 2 is a diagram of a WLAN that transmits Request To Send (RTS)/Clear To Send (CTS) frames. Two additional frames, i.e. a RTS frame and a CTS frame, are added to the IEEE 802.11 MAC frame so as to solve the problem of FIG. 1. When a source node transmits the RTS frame, the destination node transmits the CTS frame in response to the RTS frame. The RTS frame is transmitted before a data frame is transmitted. The nodes receiving the RTS and CTS frames cease to transmit frames during an interval specified in the RTS/CTS frames.

As shown in FIG. 2, when the source node is 'A' and the destination node is 'B', the node 'B' that received the RTS frame from the node 'A' transmits the CTS frame to node 'A' in response to the RTS frame, and node 'C' can receive the CTS frame transmitted from the node 'B' since the node 'C' is located within the cell coverage of the node 'B'. The node 'C' ceases to transmit frames during the interval that is contained in the CTS frame that is transmitted from the node 'B'. Due to the cell coverage of the node 'A', nodes other than node 'A' cease to transmit frames for a predetermined interval from a time point when the node 'A' transmits the RTS frame. Due to the cell coverage of the node 'B', nodes other than node 'B' cease to transmit frames for a predetermined interval from a time point when the node 'B' transmits the CTS frame.

The RTS/CTS frame cannot be used when a large bandwidth is not required, or when nodes located in a small area can transmit/receive frames to/from each other, or when many channels are not concentrated.

Figure 3:
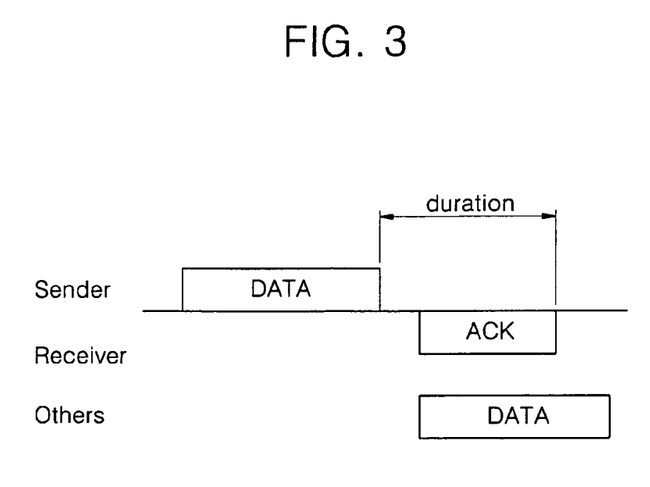
FIG. 3 is a diagram of a virtual carrier sensing method of an IEEE 802.11 WLAN.

FIG. 3 is a diagram of a virtual carrier sensing method of an IEEE 802.11 WLAN. In the virtual carrier sensing method, in order to provide a reservation status of a channel, a node at a transmitter side transmits an RTS frame and a node at a receiver side transmits a CTS frame to the node at the transmitter side and nodes around the node at the receiver side in response to the RTS frame before a node transmits a data frame, or a reservation status of a channel can be provided using Duration/ID fields contained in the frame to be transmitted.

FIG. 3 shows a method of providing a reservation status of a channel using the Duration/ID fields contained in the frame to be transmitted, and the other nodes are provided with an indication that a medium is busy (or reserved) during a predetermined interval using the Duration/ID fields. As shown in FIG. 3, in the IEEE 802.11 WLAN, a node (sender) at a transmitter side transmits a frame having a Duration field containing information about an interval (duration) during which a node (receiver) at a receiver side can transmit an ACK frame to the sender without collision. The other nodes except the sender and the receiver cease to transmit a data frame (DATA) during the duration so that the receiver can successfully transmit the ACK frame to the sender.

However, as shown in FIG. 3, if a node does not provide the duration contained in the data frame transmitted from another node and the node transmits a data frame to another node, the ACK frame cannot be successfully transmitted.

Particularly, in a WLAN environment in which both wireless terminals conforming to IEEE 802.11b and wireless terminals conforming to IEEE 802.11g are located, it is impossible for a wireless terminal conforming to IEEE 802.11b to demodulate a data frame conforming to IEEE 802.11g using the Orthogonal Frequency Division Multiplexing (OFDM) modulation scheme, and thus a collision during data frame transmission can occur.

Hereinafter, exemplary embodiments of the present invention are described in detail with reference to the accompanying drawings.

Figure 4:
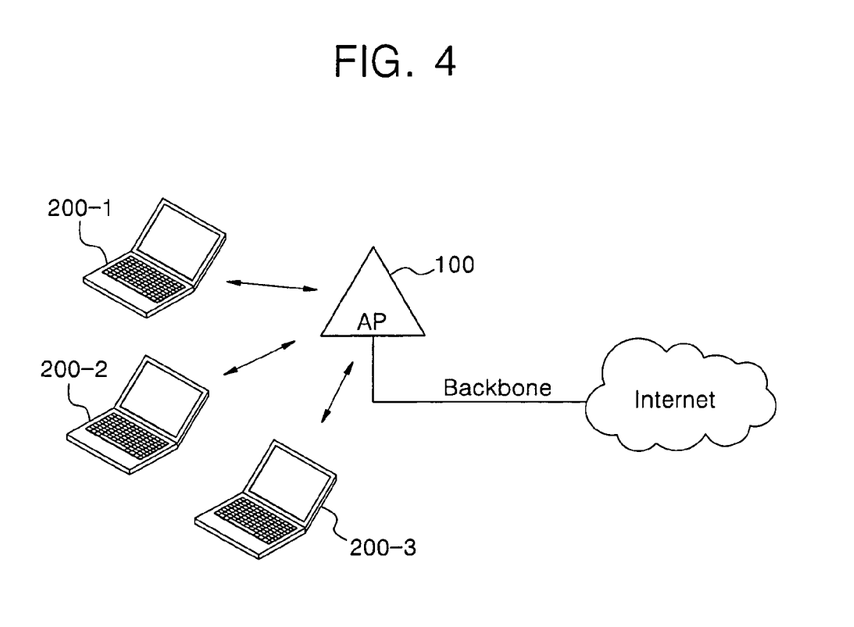
FIG. 4 is a diagram of a configuration of a WLAN according to an exemplary embodiment of the present invention.

FIG. 4 is a diagram of a configuration of a WLAN according to an exemplary embodiment of the present invention.

The WLAN includes at least one wireless terminal 200-1, 200-2 and 200-3, and an AP 100. A plurality of APs are connected to the Internet via a backbone network. The at least one wireless terminal 200-1, 200-2 and 200-3 can be a laptop computer or Personal Digital Assistant (PDA). However, the at least one wireless terminal 200-1, 200-2 and 200-3 is not limited to a portable device.

The AP 100 functions as a bridge between networks because a frame of IEEE 802.11 has to be transformed into another frame format when the IEEE 802.11 frame is transmitted to another network. The AP 100 transmits a frame to a destination via the backbone network. The backbone network can be an Ethernet. A wireless terminal in which a WLAN module is installed is provided with data service through the AP 100, and the AP 100 covers a limited area.

The IEEE 802.11 standard adopts a Distributed Coordination Function (DCF) as a medium access method. In the DCF, wireless terminals share a medium based on a Carrier Sensing Multiple Access/Collision Avoidance (CSMA/CA) protocol and a random back off. The IEEE 802.11 standard adopts a virtual method, in which a carrier is detected at a physical layer (PHY), or alternatively a carrier is detected based on a Network Allocation Vector (NAV), as a carrier detection method, and uses an Interframe Space (IFS) to allocate a priority to the access to the medium.

IEEE 802.11b adopts the Direct Sequence Spread Spectrum (DSSS) scheme of IEEE 802.11, and increases a data transfer rate by enhancing processing of a physical layer. IEEE 802.11b supports data transfer rates such as 1 Mbps, 2 Mbps, 5.5 Mbps and 1 Mbps, and the IEEE 802.11 DSSS supports data transfer rates of 1 Mbps and 2 Mbps. In the DSSS scheme, data is spread spectrum modulated using a chipping code, especially data is spread spectrum modulated using 11 bits of a Barker Sequence as the chipping code. The 11 bits of the chipping code is modulated into a radio frequency signal, i.e. a symbol. A symbol can be represented using one bit or two bits depending upon a modulation method. Binary Phase Shift Keying (BPSK) modulation is used in the 1 Mbps data transfer rate, and Quadrature Phase Shift Keying (QPSK) modulation is used in the 2 Mbps data transfer rate. A transfer rate of a symbol is limited depending upon a length of the chipping code. In IEEE 802.11, the transfer rate of a symbol (chipping rate) is 1 Mbps so that a million symbols per a second can be transmitted.

Complementary Code Keying (CCK) is used for the allocation of the chipping code at the 5.5 Mbps and 1 Mbps data transfer rate in IEEE 802.11b. A symbol can be variously expressed using a code word appropriate for a signal among 64 8-bit code words in the CCK method. The CCK uses an 8 bits of chipping code, and thus, the transfer rate of the symbol can be increased. 2 bits are allocated to an index of a code word at the 5.5 Mbps data transfer rate, and 6 bits are allocated to an index of a code word at the 11 Mbps data transfer rate.

IEEE 802.11g can support a 54 Mbps data transfer rate in the 2.4 GHz band. IEEE 802.11a also supports a 54 Mbps data transfer rate, and both IEEE 802.11b and IEEE 802.11g use the 2.4 GHz band. IEEE 802.11g supports the Barker Sequence and a DSSS physical layer of the CCK so as to be compatible with IEEE 802.11a, and also supports a physical layer of the OFDM for a high data transfer rate. Since the CCK and OFDM are not compatible with each other, the CCK and OFDM cannot be used in the same channel. IEEE 802.11g basically adopts a single transmission method selected from the CCK and OFDM methods. IEEE 802.11g has an optional transmission method in which an OFDM payload is included in a CCK header so as to be compatible with CCK, or alternatively adopts a Packet Binary Convolutional Coding (PBCC) method. However, the optional transmission method can have a CCK header with a length longer than that of the OFDM header in a high data transfer rate, thereby deteriorating communication quality.

In order to solve above problem, in IEEE 802.11, one AP can selectively adopt the RTS/CTS method for wireless terminals using the CCK or the wireless terminals using the OFDM. In the RTS/CTS method, all wireless terminals have to transmit a Request To Send (RTS) frame and have to receive a Clear To Send (CTS) frame from the AP before all wireless terminals transmit data frame to the AP.

Figure 5:
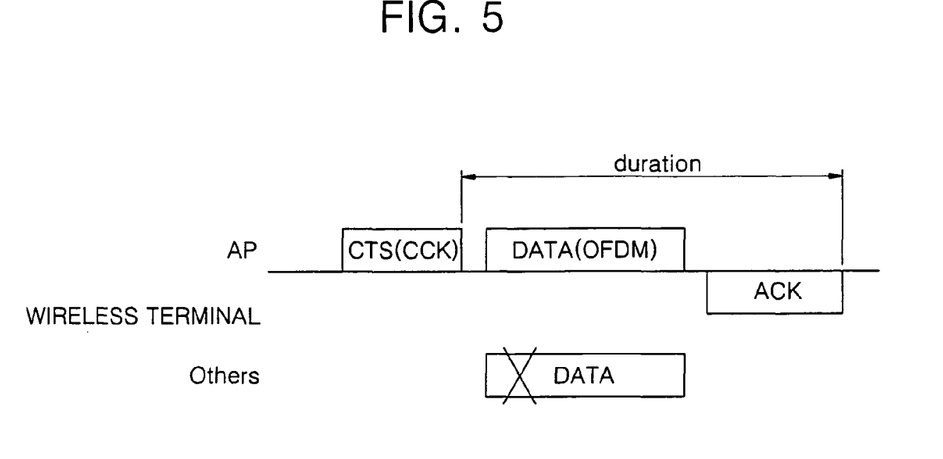
FIG. 5 is a diagram of a method of controlling a transmission of frames based on a CTS frame according to an exemplary embodiment of the present invention.

FIG. 5 is a diagram of a method of controlling a transmission of frames based on a CTS frame according to an exemplary embodiment of the present invention.

As described above, IEEE 802.11g differs from IEEE 802.11b in that IEEE 802.11g uses the OFDM modulation and thus supports data transfer rates 6 Mbps, 9 Mbps, 12 Mbps, 18 Mbps, 24 Mbps, 48 Mbps and 54 Mbps as well as the 1 Mbps, 2 Mbps and 5.5 Mbps data transfer rates of IEEE 802.11b. However, in a WLAN where IEEE 802.11b compliant wireless terminals and IEEE 802.11g compliant wireless terminals are located within a cell coverage of an AP, the IEEE 802.11b compliant wireless terminals according to an example embodiment of the present invention cannot perform OFDM demodulation, and thus cannot perform the virtual carrier sensing.

In order to solve above problem, in the WLAN where IEEE 802.11b compliant wireless terminals and IEEE 802.11g compliant wireless terminals are located within cell coverage of an AP, the AP transmits a CTS frame that is modulated according to the IEEE 802.11b standard.

Referring to FIG. 5, the method of controlling the transmission of frames according to an embodiment of the present invention differs from the conventional method, in which a wireless terminal that transmits a data frame transmits a RTS frame and a wireless terminal that receives the data frame transmits a CTS frame in response to the RTS frame, in that the wireless terminal that transmits a data frame transmits a CTS frame, and thus the wireless terminal that receives the data frame does not have to transmit the CTS frame to the wireless terminal that transmits the data frame. Namely, unnecessary overhead due to the exchange of the CTS frame and RTS frames can be reduced by transmitting only the CTS frame without using the RTS frame, and data collision can be avoided.

The CTS frame can include a Duration field that contains a transmission cease time. The transmission cease time is used for preventing a data collision due to a data frame transmitted from wireless terminals other than a source wireless terminal. The wireless terminals that receive the CTS frame from the AP cease a data transmission of the wireless terminals during an interval corresponding to the transmission cease time contained in the duration field of the CTS frame. Referring back to FIG. 5, a data frame transmission is deferred for wireless terminals other than a destination wireless terminal during the transmission cease time ("duration" shown in FIG. 5) from a time point when the AP transmits the CTS frame.

The AP transmits a CTS frame modulated using Complementary Code Keying (CCK) at about 5.5 Mbps or at about 11 Mbps, or alternatively transmits a CTS frame modulated using BPSK or QPSK at about 1 Mbps or at about 2 Mbps. When the wireless terminal at the receiver side conforms to IEEE 802.11g, a data frame, which is transmitted after the AP transmits a CTS frame conforming to IEEE 802.11b, is demodulated using the OFDM conforming to IEEE. 802.11g and then transmitted. In other words, the CTS frame transmitted to a wireless terminal at the receiver side conforms to IEEE 802.11b. However, the data frame transmitted to the wireless terminal at the receiver side conforms to IEEE 802.11g.

A method of adjusting the data transfer rate, which is adaptively adjusted by the AP according to a location and a transmission standard of wireless terminals located within the cell coverage of the AP, is explained as follows.

Generally, in the WLAN, an 11 Mbps data transfer rate, i.e. the fastest data transfer rate of IEEE 802.11g, is adopted so as to reduce the overhead. When an 11 Mbps data transfer rate is adopted, the bandwidth effectiveness can be enhanced. However, the cell coverage of the AP can be shortened compared with the case in which a 1 Mbps, 2 Mbps, or 5.5 Mbps data transfer rate is adopted because the wireless terminal located at a longer distance from the AP has a difficulty in identifying a frame as the data transfer rate increases. Thus, when the 11 Mbps data transfer rate is adopted, the wireless terminal located at a longer distance from the AP cannot completely identify the CTS frame having the 11 Mbps data transfer rate, and fails in the virtual carrier sensing, and cannot guarantee a successful transmission of the ACK frame.

As described above, stability is reduced but the bandwidth effectiveness increases when the data transfer rate increases. However, stability is enhanced but the bandwidth effectiveness decreases when the data transfer rate decreases. According to an example embodiment of the present invention, so as to satisfy both the stability and the bandwidth effectiveness, the AP adjusts the data transfer rate of the wireless terminal depending upon a status of the wireless terminal of which status information is stored in the AP. Namely, when a wireless terminal is located at a longer distance from the AP, the AP decrease a transfer rate of a CTS frame to transmit the CTS frame at the decreased transfer rate to the wireless terminal located at a longer distance from the AP. When a wireless terminal is located at a shorter distance from the AP, the AP increase a transfer rate of a CTS frame to transmit the CTS frame at the increased transfer rate to the wireless terminal located at a shorter distance from the AP. The AP manages an available data transfer rate of each of the wireless terminals as shown in Table 1 below. The available data transfer rate represents a data transfer rate at which the CTS frame can be successfully transmitted.

TABLE 1

| | MAC address | mode | available data transfer rate |
|---|---|---|---|
| 1 | ... | 802.11b | 11 Mbps |
| 2 | ... | 802.11g | 48 Mbps |
| 3 | ... | 802.11b | 5.5 Mbps |
| ... | ... | ... | ... |

Referring to Table 1, the AP manages information, for example, mode information and the available data transfer rate information, of all wireless terminals located within a cell coverage of the AP. When at least one wireless terminal conforming to IEEE 802.11b is connected to the AP, the AP transmits a CTS frame at a minimum data transfer rate of available data transfer rates of the at least one wireless terminals conforming to IEEE 802.11b to the wireless terminals located within the cell coverage of the AP.

Figure 6:
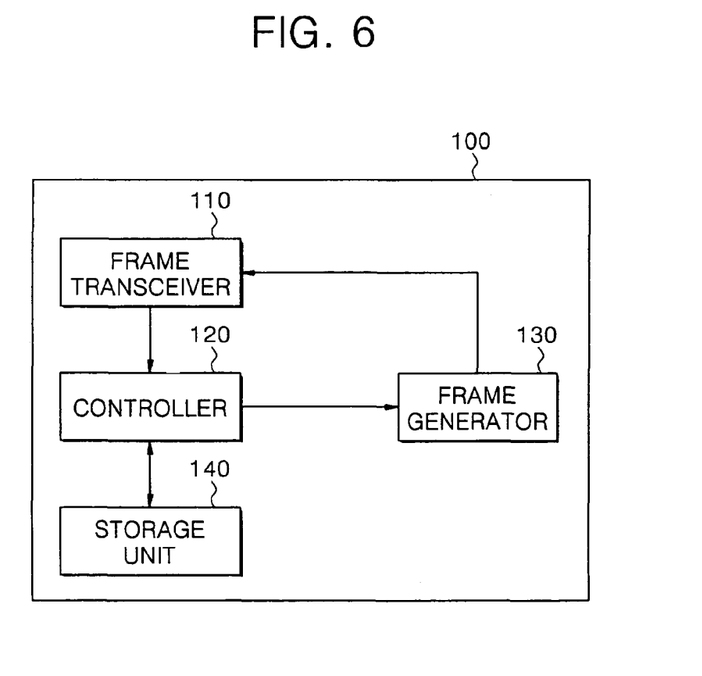
FIG. 6 is a block diagram of an Access Point (AP) according to an exemplary embodiment of the present invention.

FIG. 6 is a block diagram of an AP according to an example embodiment of the present invention.

Referring to FIG. 6, the AP includes a frame transceiver 110, a frame generator 130, a controller 120 and a storage unit 140.

The frame transceiver 110 receives frames transmitted from wireless terminals located within the cell coverage of the AP to output the received frames to the controller 120, and transmits the CTS frame or the data frame provided from the frame generator 130 to a wireless terminal.

The frame generator 130 generates a CTS frame modulated using CCK modulation based on the data transfer rate of the CTS frame provided from the controller 120. The frame generator 130 generates a CTS frame modulated using CCK when the data transfer rate of the CTS frame provided from the controller 120 corresponds to about 5.5 Mbps or about 11 Mbps, and generates a CTS frame modulated using BPSK or QPSK when the data transfer rate of the CTS frame provided from the controller 120 corresponds to about 1 Mbps or about 2 Mbps. The frame generator 130 generates a data frame based on information of modulation method of the wireless terminal at the receiver side that conforms to IEEE 802.11b or IEEE 802.11g. The frame generator 130 outputs the generated CTS frame and the data frame to the frame transceiver 110.

The storage unit 140 stores information about all wireless terminals located within the cell coverage of the AP. The information can include a MAC address, a mode, and available data transfer rate of the each of the wireless terminals, etc., as shown in Table 1.

The controller 120 receives mode information of each of the wireless terminals from the storage unit 120 to determine whether the wireless terminals are compliant with IEEE 802.11b, compares the available data transfer rates of the wireless terminals compliant with IEEE 802.11b, and selects a minimum available data transfer rate of the available data transfer rates of the wireless terminals compliant with IEEE 802.11b. The selected data transfer rate is provided to the frame generator 130, and the frame generator 130 generates a frame having the selected data transfer rate. The controller 120 provides the mode information of each of the wireless terminals to the frame generator 130 so that the frame generator 130 can generate a data frame using a modulation method corresponding to the mode information.

Figure 7:
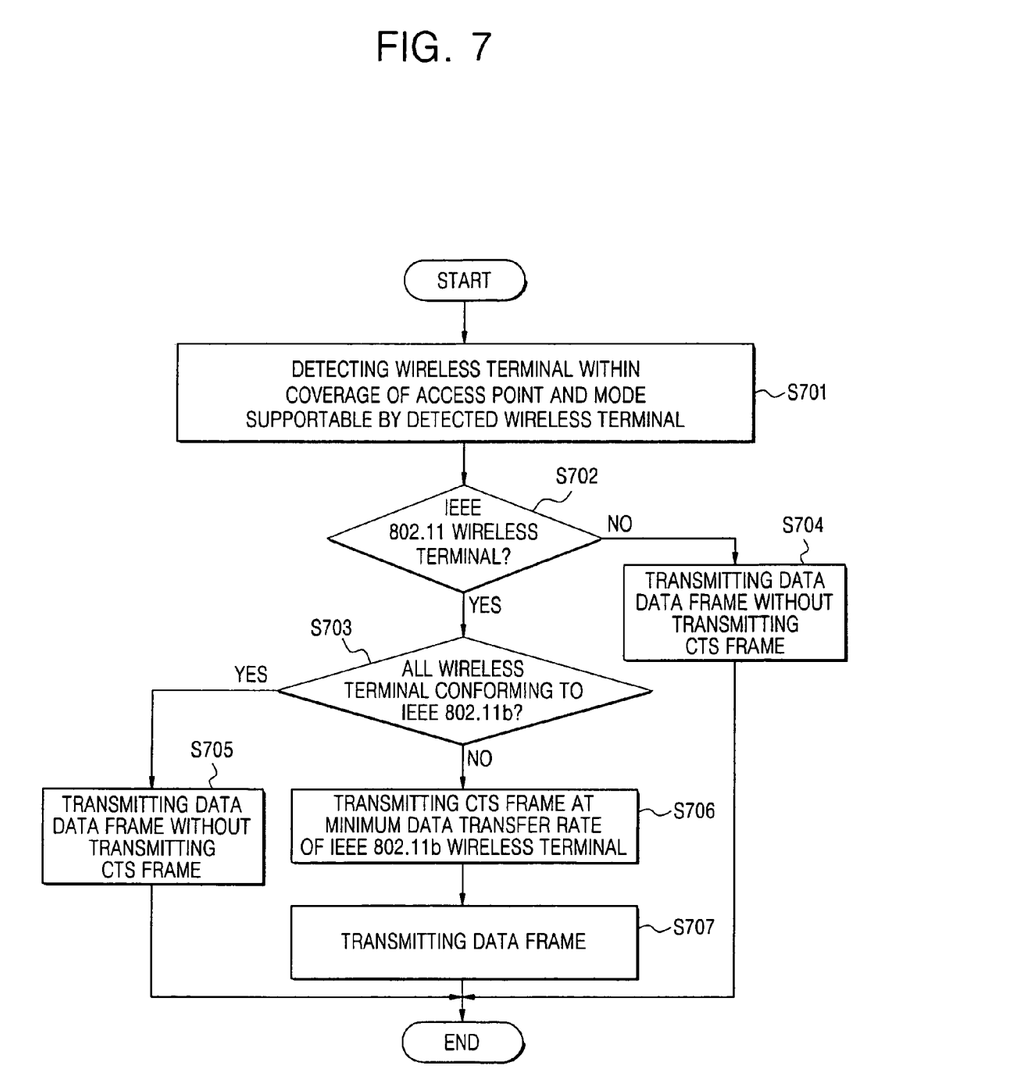
FIG. 7 is a flow diagram of the operation of an AP according to an exemplary embodiment of the present invention.

FIG. 7 is a flowchart of the operation of an AP according to an example embodiment of the present invention.

Referring to FIG. 7, the AP detects wireless terminals located within a cell coverage of the AP and mode information that can be supported by the detected wireless terminals (step S701). The mode information that can be supported by the detected wireless terminals represents an IEEE 802.11b standard or an IEEE 802.11g standard that a wireless terminal supports. The AP determines whether a wireless terminal compliant to IEEE 802.11b exists among the detected wireless terminals located within the cell coverage of the AP (step S702). The AP does not transmit a CTS frame and transmits a data frame when no wireless terminal compliant to IEEE 802.11b exists among the detected wireless terminals located within the cell coverage of the AP (step S704). Since the data frame transmitted at step S704 is transmitted to the wireless terminal compliant to IEEE 802.11g, the data frame transmitted at step S704 corresponds to a data frame modulated using OFDM.

When at least one wireless terminal compliant to IEEE 802.11b exists among the detected wireless terminals, the AP determines whether all of the detected wireless terminals conform to IEEE 802.11b (step S703).

When all of the detected wireless terminals conform to IEEE 802.11b, the AP does not transmit a CTS frame and transmits a data frame to the wireless terminals compliant to IEEE 802.11b (step S705).

The AP transmits a CTS frame at a minimum data transfer rate of available data transfer rates of the wireless terminals conforming to IEEE 802.11b when both wireless terminals compliant to IEEE 802.11b and wireless terminals compliant to IEEE 802.11g exist among the detected wireless terminals (step S706). The AP transmits data frames modulated using a modulation method corresponding to the mode of each of the wireless terminals when the transmission of the CTS frame has been completed (step S707).

Although above exemplary embodiments of the present invention mainly describe IEEE 802.11b and IEEE 802.11g that are widely used in the WLAN, the scope of the present invention is not restricted to the case in which the wireless terminals located within the cell coverage of the AP includes wireless terminals compliant to IEEE 802.11b or wireless terminals compliant to IEEE 802 11g. However, the scope of the present invention includes the case in which the wireless terminals located within the cell coverage of the AP includes wireless terminals compliant to other IEEE 802.11 standards when the CTS or any equivalent format is related to the CTS frame.

According to the method of transmitting frame in the WLAN, the data transfer rate of the CTS frame is variably adjusted when the wireless terminals located within the cell coverage of the AP includes both wireless terminals compliant to IEEE 802.11b and wireless terminals compliant to IEEE 802 11g, thereby enhancing both the stability and the bandwidth effectiveness.

While the example embodiments of the present invention and their advantages have been described in detail above, it should be understood that various modifications, substitutions and alterations can be made herein without departing from the scope of the present invention.

What is claimed is:

1. A method of transmitting a frame in a Wireless Local Area Network (WLAN), the method comprising:
    collecting mode information and an available data transfer rate of each wireless terminal located within a coverage area of an Access Point (AP);
    determining whether the AP transmits a Clear To Send (CTS) frame depending upon an existence of wireless terminals corresponding to the collected mode information before the AP transmits a data frame to at least one wireless terminal among the wireless terminals located within the coverage area of the AP; and
    adjusting a data transfer rate of the CTS frame based on the collected available data transfer rate of each of the wireless terminals to transmit the CTS frame at the adjusted data transfer rate.

2. The method of claim 1, wherein the mode information comprises information corresponding to one of Institute of Electrical and Electronics Engineers (IEEE) 802.11b and IEEE 802.11g.

3. The method of claim 1, wherein determining whether the AP transmits a CTS frame comprises transmitting the CTS frame if at least one first wireless terminal conforming to Institute of Electrical and Electronics Engineers (IEEE) 802.11b and at least one second wireless terminal conforming to IEEE 802.11g are located within the coverage area of the AP.

4. The method of claim 3, wherein the adjusted data transfer rate of the CTS frame corresponds to a minimum data transfer rate of available data transfer rates of the at least one first wireless terminal conforming to IEEE 802.11b.

5. The method of claim 1, wherein determining whether the AP transmits a CTS frame comprises determining that the CTS frame is not transmitted if only first wireless terminals conforming to Institute of Electrical and Electronics Engineers (IEEE) 802.11b are located within the coverage area of the AP, or if only second wireless terminals conforming to IEEE 802.11g are located within the coverage area of the AP.

6. The method of claim 1, wherein the CTS frame is modulated using Complementary Code Keying (CCK) if the adjusted data transfer rate of the CTS frame corresponds to 5.5 Mbps or 11 Mbps, and wherein the CTS frame is modulated using Binary Phase Shift Keying (BPSK) or Quadrature Phase Shift Keying (QPSK) if the adjusted data transfer rate of the CTS frame corresponds to 1 Mbps or 2 Mbps.

7. The method of claim 1, further comprising transmitting a data frame modulated using Complementary Code Keying (CCK) or Orthogonal Frequency Division Multiplexing (OFDM) depending upon the mode information of each of the wireless terminals.

8. The method of claim 7, further comprising receiving the data frame to transmit an ACK frame to the AP by at least one first wireless terminal corresponding to a destination of the data frame.

9. The method of claim 1, further comprising receiving the CTS frame from the AP to cease a data transmission by at least one second wireless terminal during an interval corresponding to a transmission cease time specified in a duration field of the CTS frame, the at least one second wireless terminal not corresponding to a destination of the data frame.

10. A method of transmitting a frame in an Access Point (AP) of a Wireless Local Area Network (WLAN), the method comprising:
    collecting an available data transfer rate of each wireless terminal located within a coverage area of the AP and mode information corresponding to one of Institute of Electrical and Electronics Engineers (IEEE) 802.11b and IEEE 802.11g; and
    transmitting a Clear To Send (CTS) frame at a minimum data transfer rate of available data transfer rates of at least one first wireless terminal conforming to IEEE 802.11b before sending a data frame when the at least one first wireless terminal conforming to IEEE 802.11b and at least one second wireless terminal conforming to IEEE 802.11g are located within the coverage area of the AP.

11. The method of claim 10, wherein the CTS frame is not transmitted if only the at least one first wireless terminal conforming to IEEE 802.11b is located within the coverage area of the AP, and wherein whether the CTS frame is transmitted is determined based on a number of the at least one second wireless terminal conforming to IEEE 802.11g and distances between each of the at least one second wireless terminal and the AP if only the at least one second wireless terminal conforming to IEEE 802.11g is located within the coverage area of the AP.

12. A Wireless Local Area Network (WLAN), comprising:
    an Access Point (AP) to collect mode information and an available data transfer rate of each wireless terminal located within a coverage area of the AP, to determine whether the AP transmits a Clear To Send (CTS) frame depending upon an existence of wireless terminals corresponding to the collected mode information before the AP transmits a data frame, and to adjust a data transfer rate of the CTS frame based on the collected available data transfer rate of each of the wireless terminals to transmit the CTS frame at the adjusted data transfer rate; and
    at least one wireless terminal to receive the CTS frame from the AP and to cease a data transmission of the at least one wireless terminal during an interval corresponding to a transmission cease time specified in a duration field of the CTS frame.

13. The WLAN of claim 12, wherein the mode information comprises information corresponding to one of Institute of Electrical and Electronics Engineers (IEEE) 802.11b and IEEE 802.11g.

14. The WLAN of claim 12, wherein the AP is configured to transmit the CTS frame at a minimum data transfer rate of the available data transfer rates of at least one first wireless terminal conforming to Institute of Electrical and Electronics Engineers (IEEE) 802.11b if the at least one first wireless terminal conforming to IEEE 802.11b and at least one second wireless terminal conforming to IEEE 802.11g are located within the coverage area of the AP.

15. The WLAN of claim 12, wherein the CTS frame is not transmitted if only first wireless terminals conforming to Institute of Electrical and Electronics Engineers (IEEE) 802.11b are located within the coverage area of the AP, or if only second wireless terminals conforming to IEEE 802.11g are located within the coverage area of the AP.

16. The WLAN of claim 12, wherein the CTS frame is modulated using Complementary Code Keying (CCK) if the adjusted data transfer rate of the CTS frame corresponds to 5.5 Mbps or 11 Mbps, and wherein the CTS frame is modulated using Binary Phase Shift Keying (BPSK) or Quadrature Phase Shift Keying (QPSK) if the adjusted data transfer rate of the CTS frame corresponds to 1 Mbps or 2 Mbps.

17. An Access Point (AP) conforming to both Institute of Electrical and Electronics Engineers (IEEE) 802.11b and IEEE 802.11g, the AP comprising:
 a storage unit to store information associated with wireless terminals located within a coverage area of the AP;
 a controller to collect mode information of each of the wireless terminals, and to determine a data transfer rate of a Clear To Send (CTS) frame, the determined data transfer rate of the CTS frame corresponding to a minimum data transfer rate of available data transfer rates of at least one first wireless terminal conforming to IEEE 802.11b if the at least one first wireless terminal conforming to IEEE 802.11b and at least one second wireless terminal conforming to IEEE 802.11g are located within the coverage area of the AP; and
 a frame generator to generate the CTS frame based on the determined data transfer rate of the CTS frame.

18. The AP of claim 17, wherein the frame generator is configured to modulate the CTS frame using Complementary Code Keying (CCK) if the determined data transfer rate of the CTS frame corresponds to 5.5 Mbps or 11 Mbps, and to modulate the CTS frame using Binary Phase Shift Keying (BPSK) or Quadrature Phase Shift Keying (QPSK) if the determined data transfer rate of the CTS frame corresponds to 1 Mbps or 2 Mbps.

19. The AP of claim 17, wherein the information associated with the wireless terminals comprises at least one of a Media Access Control (MAC) address, a mode, and available data transfer rates of each of the wireless terminals.

20. The AP of claim 17, further comprising a frame transceiver to transmit the CTS frame generated by the frame generator or a data frame to at least one wireless terminal.

* * * * *